Aug. 14, 1962 — R. C. UPTON — 3,049,576
ELECTRIC SALT BATH FURNACE
Filed May 16, 1960 — 2 Sheets-Sheet 1

*INVENTOR.*
RICHARD C. UPTON
BY
ATTORNEYS

Aug. 14, 1962 R. C. UPTON 3,049,576
ELECTRIC SALT BATH FURNACE
Filed May 16, 1960 2 Sheets-Sheet 2

INVENTOR.
RICHARD C. UPTON
BY
ATTORNEYS

United States Patent Office 3,049,576
Patented Aug. 14, 1962

3,049,576
ELECTRIC SALT BATH FURNACE
Richard C. Upton, Mount Clemens, Mich., assignor to Upton Electric Furnace Company, Inc., Roseville, Mich., a corporation of Michigan
Filed May 16, 1960, Ser. No. 29,468
8 Claims. (Cl. 13—23)

The invention relates to improvements in molten salt bath furnaces of the type in which heat is supplied to the bath by the passage of electric current through the molten salt between electrodes immersed therein. It is an object of the invention to effect an arrangement of electrodes in the bath so as to supply the electric energy at relatively high voltage and correspondingly lower current than heretofore, resulting in less costly and more efficient electric circuit exterior to the bath and less costly electrodes easier to maintain and to change when worn out.

A further object is to render the working space of the bath itself relatively clear of voltage to ground and through its entire volume free of any voltage differences which could cause appreciable heating currents to pass through the work immersed therein. Furthermore, the electrical characteristics of the furnace are rendered independent of the size and shape of the working space.

Figure 1:
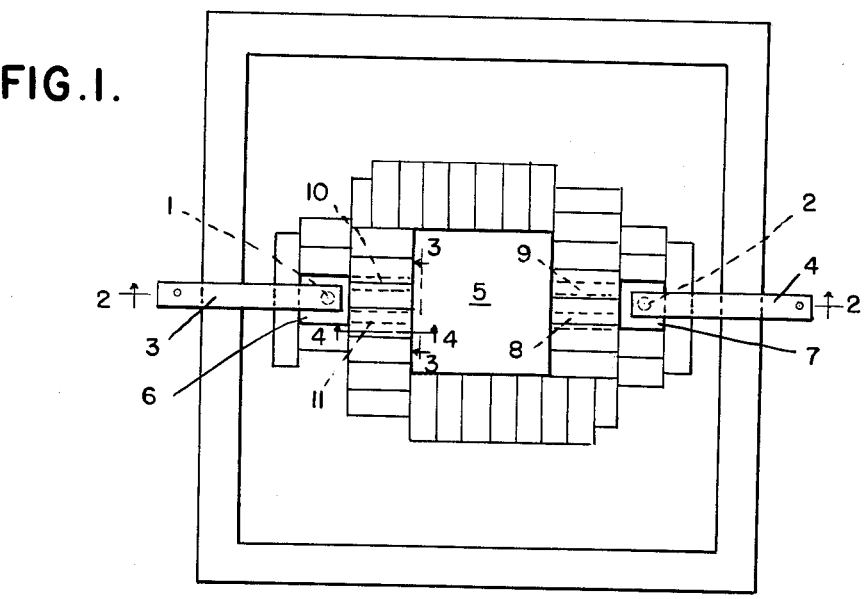
FIGURE 1 is a plan view of one construction of the furnace.
Figure 2:
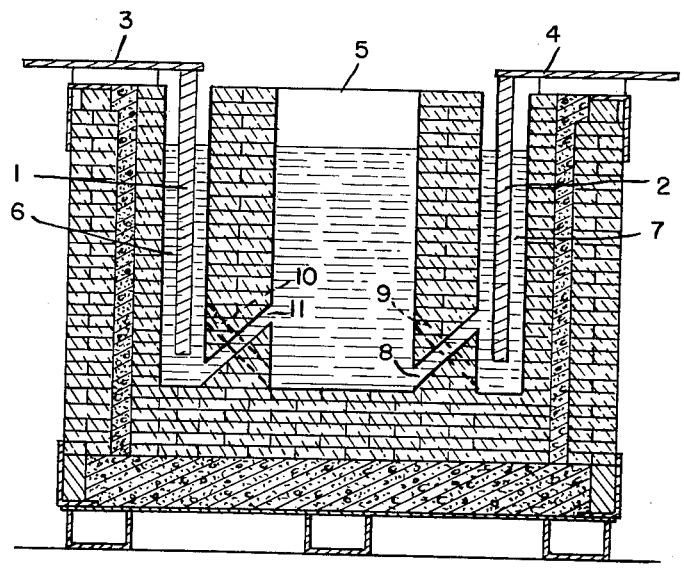
FIG. 2 is a cross section on line 2—2 of FIG. 1.
Figures 5, 6:
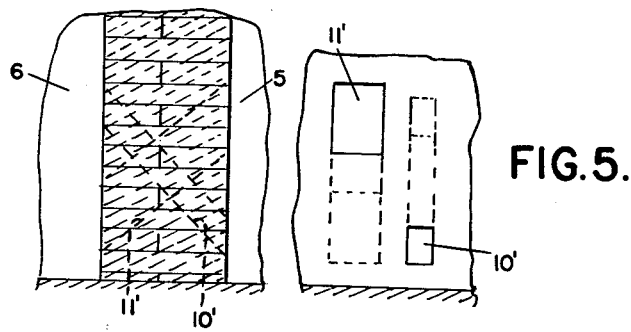
FIGS. 5 and 6 are views similar to FIGS. 3 and 4 slightly modified in construction.

As shown in FIGS. 1 and 2, single phase electric energy is supplied to the furnace through electrodes 1 and 2 which have external connections 3 and 4. The molten salt is contained in chambers 5, 6, 7, preferably open top well chambers in a ceramic body. The chambers 6 and 7 are adapted to receive respectively the electrodes 1 and 2 inserted therein through the open top. Each of these chambers 6 and 7 is connected to the chamber 5 by pairs of channels or passageways 8, 9 and 10, 11, respectively, which are also filled with a molten salt. All of the passageways are of small cross section relative to their length, so that the electrical resistance of each is high compared with the electrical resistance across the work chamber 5. At least one of each pair of channels extends upwardly through the ceramic wall from its opposite ends which connect at different levels to the chambers. As shown, the channels of each pair are inclined and are similar to each other. Thus, in FIG. 2, channels 8 and 11 each extend upwardly from left to right and the other channels 9 and 10, extend upwardly from right to left. This specific construction is not essential and as shown in FIGS. 5 and 6, the channel 11' extending upwardly toward work chamber 5 is larger in cross section than the oppositely extending channel 10'. The electric current flowing between electrodes 1 and 2 will pass into the molten salt in chamber 6, then in parallel through the channels 10 and 11, then through the working chamber 5, and then in parallel through the channels 8 and 9 into chamber 7 and electrode 2.

As a practical example, in an actual furnace, the working space is 13½" square by 24" deep, with 4" freeboard on top. The salt is 20" deep and the cross section of the current path through the working space is 13½" x 20, which is 270 square inches, and the length of the cross sectional path is 13½" and the relative resistance of the part of the circuit is $$\frac{13\frac{1}{2}}{270}, \text{ which is } \frac{1}{20}$$

The passageways are each of 2" square cross section and 6" long, for a total cross section of 8 square inches for the two passageways in parallel. The length of this path is 6" plus 6" for a total of 12" and the relative resistance of this part of the circuit is $$\frac{12}{8} \text{ or } 1\frac{1}{2}$$

Figures 3, 4:
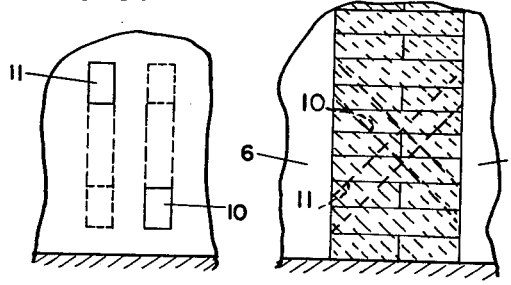
FIG. 3 is an elevation somewhat enlarged, viewed from line 3—3 of FIG. 1.
FIG. 4 is a section enlarged to the same scale as FIGURE 3 taken on line 4—4 of FIG. 1.

The resistance of the path of current flow between the electrode is therefore proportioned as follows:

$$\frac{\frac{1}{20}}{\frac{1}{20}+1\frac{1}{2}}=\frac{1}{31}=.03226$$

for working space, and $$\frac{1\frac{1}{2}}{\frac{1}{20}+1\frac{1}{2}}=\frac{30}{31}=.96774$$

for passageways. Hence, approximately only 3% of the heat supplied to the bath would be generated in the working space and 97% generated in the passageways. Actually measured in a furnace of the above description was a current of 400 ampere and supply voltage 120 volts with 3 volts across the working space, and 58½ volts across each set of passageways—1.2 kw. in the working space and 46.8 kw. in the passageways. The heat generated in the passageways results in convection currents in the salt in the passageways from left to right in one of each pair, and from right to left in the other of the same pair, being thus complementary in establishing a rapid uninhibited circulation of heated salt between the two electrode wells and the working space. While the two passageways are shown as practically of the same cross section and slope and length, modifications are possible as shown in FIG. 3, where the passageways are of different cross section. The heat generated in narrow passage 10' is less than that generated in wide passage 9' though the amount of salt passing through each of the passages is the same, hence hotter salt is discharged into the working space than into the electrode well. Likewise different slopes and hence different length of passageways of a complementary pair would not essentially alter the basic function of the thermal circulation between the electrode wells and the working area.

Figure 7:
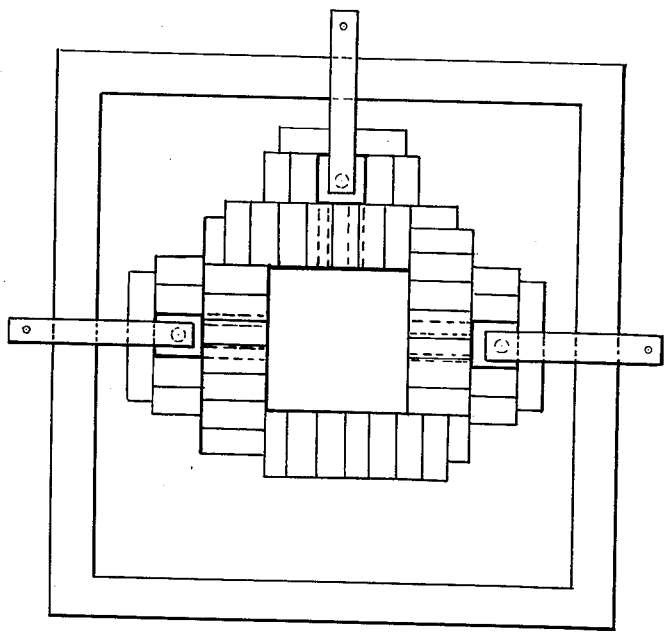
FIG. 7 is a plan view of a furnace in which the heat is generated by multi-phase electric energy.

FIG. 7 shows in plan view a typical 3-phase circuit with three electrodes feeding into three sets of sloped passageways into a working space. In this case the electric load is actually a three-phase Y connected load, fed from a three-phase, three-wire feeder. The Y connection point is the center of the working space and the maximum voltage across any part of the working space is about 2 volts when the line voltage is 120 volts delta, clear of ground. Hence the working bath itself is readily grounded, thus establishing a neutral ground for the three-phase feeder, a most safe condition so far as electrical hazard is concerned. Even with a 120 volt ungrounded supply brought right to the furnace, practically all the supplied voltage is used up in the passageways. Actual measured voltages are shown. The maximum voltage between any two points in the working volume is two volts.

I claim:
1. In a molten salt bath furnace heated by the passage of an electrical current through the molten salt, the combination with an electrode to conduct current into the molten salt of a well or compartment in the salt bath separated by an electrically insulating wall from that portion of the salt bath used for the working space of the furnace in which well the electrode makes contact with the molten salt, and passageways through the said insulating wall, so arranged that the electric current flowing from the electrode passes through these passageways, the said passageways being so arranged that molten salt will circulate between the said working space and the said electrode well under the influence of the heat generated in the passageways by the passage of the electric currents therethrough.

2. In a molten salt bath type of furnace, means for heating the bath comprising an insulator wall laterally between two chambers containing the molten salt, a pair of channels through said wall connecting said chambers and also filled with the molten salt, at least one of said channels being relatively small in cross section and extending longitudinally from its end connecting with one of said chambers to its opposite end which connects at a higher level with the other chamber, electric energy supply means impressing different voltages on the molten material in the two chambers whereby electric current flowing through the salt in the said channel will generate heat therein and the heated material will flow upward into the chamber having the higher level connection, displacing material from said chamber through the other channel of the pair into the chamber on the opposite side of said wall thus continuously heating the molten salt and circulating the salt between said chambers while maintaining substantially constant volumes therein.

3. In a molten salt bath type of furnace a body of insulator material having therein a work well and a plurality of wells smaller in cross section adjacent to said work well, with a pair of channels through the intervening insulator material connecting each of the small wells with said work well and adapted to flow the molten salt in opposite directions therebetween, an electrode extending into each of said small wells, and a supply of electric energy imposing different voltages on said electrodes, at least one channel of each pair being of relatively small cross section and extending from its end connecting with the small well to a connection at higher elevation to the work well, the molten salt in each channel conducting electric current and through its high resistance generating heat therein which is much greater than that generated by passage of electric current through the material in the work well or any other part of the circuit.

4. In a molten salt bath type of furnace a chamber for the molten salt bath having an insulator wall with a channel of small cross section therethrough also filled with molten salt being fed into said chamber and heated by electric current passed therethrough, the resistance by reason of the small cross section of the molten salt within said channel being high and permitting of generating heat from relatively high voltage electrical energy with corresponding low current thereby simplifying and reducing costs of installation and maintenance of the electric equipment.

5. In a molten salt bath type of furnace a work chamber containing a molten salt bath, an insulator wall surrounding said chamber, a plurality of small chambers adjacent said work chamber with said wall therebetween a plurality of electrodes extending into said small chambers, a pair of channels for each small chamber extending through said wall and connecting with said work chamber, said small chambers and channels also having molten salt therein, at least one of each pair of channels being of small cross section and connecting to the opposite chambers at different levels with the highest at the work chamber, a supply of electric energy connecting with said electrodes to impress different voltages thereon whereby electric current will flow from said electrodes through the molten salt in said small chamber channels and work chamber generating heat therein which by reason of the small cross section and high resistance of the material in said channel is greater than in other portions of the circuit and the heated material will flow through the higher level connection into the work chamber and displace material therefrom which will flow back through the companion channel of the pair into the small chamber thus continuing to circulate.

6. A furnace for a molten salt bath and the like comprising a body of dielectric material having a work receiving chamber and at least one electrode receiving chamber with an insulator wall between the same, a first channel in said insulator wall connecting said chambers, a second channel in said insulator wall connecting said chambers, said chambers and connecting channels all containing a conducting liquid, an electrode housed in said electrode chamber, at least said first channel having a small cross-sectional dimension compared to the cross-section of said work receiving chamber and a second electrode for completing the electric circuit through said work receiving chamber.

7. A furnace for molten salt bath and the like, characterized in comprising a body of dielectric material having a work receiving chamber and at least one electrode receiving chamber with an insulator wall between them, a first channel in said insulator wall connecting said electrode receiving chamber with said work receiving chamber, a second channel in said insulator wall connecting said work receiving chamber with said electrode receiving chamber, said work receiving chamber, electrode receiving chamber and connecting channels all containing a conducting liquid, an electrode housed in said electrode chamber, at least said first channel having a small cross-sectional dimension compared to the cross-section of said electrode receiving chamber and a second electrode for completing the electric circuit.

8. A furnace as claimed in claim 1, characterized in that said electrode receiving chamber has a small cross-sectional dimension compared to the cross-section of said work receiving chamber.

References Cited in the file of this patent
UNITED STATES PATENTS 2,215,317    Brieger _____ Sept. 17, 1940

FOREIGN PATENTS 68,194     Norway _____ Aug. 14, 1944
611,609    Germany _____ Mar. 30, 1935